United States Patent [19]

Selli

[11] Patent Number: 4,478,572
[45] Date of Patent: Oct. 23, 1984

[54] PLANT AND METHOD FOR REGENERATING SAND FROM FOUNDRY CORES AND MOULDS BY CALCINATION IN A FLUIDIZED-BED FURNACE

[75] Inventor: Marino Selli, Turin, Italy

[73] Assignee: Fata Industriale S.p.A., Turin, Italy

[21] Appl. No.: 453,866

[22] Filed: Dec. 28, 1982

[30] Foreign Application Priority Data

Mar. 23, 1982 [IT] Italy ................................ 67368 A/82

[51] Int. Cl.³ ........................ F27B 14/00; F27B 15/00
[52] U.S. Cl. .......................................... 432/13; 164/5;
432/15; 432/58
[58] Field of Search ....................... 432/13, 14, 58, 15;
164/5

[56] References Cited

U.S. PATENT DOCUMENTS 2,441,594 5/1948 Ramseyer .............................. 432/58
2,821,375 1/1958 Andrews ............................... 432/58

Primary Examiner—John J. Camby
Attorney, Agent, or Firm—Sughrue, Mion, Zinn, Macpeak and Seas

[57] ABSTRACT

The invention relates to plant (1) and to a method for regenerating sand from foundry cores and moulds by calcination in a fluidized-bed furnace (2), the main characteristic of which lies in the fact that the fumes leaving the calcining furnace are used to heat a current of air which is then used, in its turn, to heat the sand to be treated at its inlet to the calcining furnace, and in that the current of air cooled by the sand to be treated is then heated by means of the purified sand leaving the calcining furnace and is then used as combustion air in the calcining furnace.

5 Claims, 1 Drawing Figure

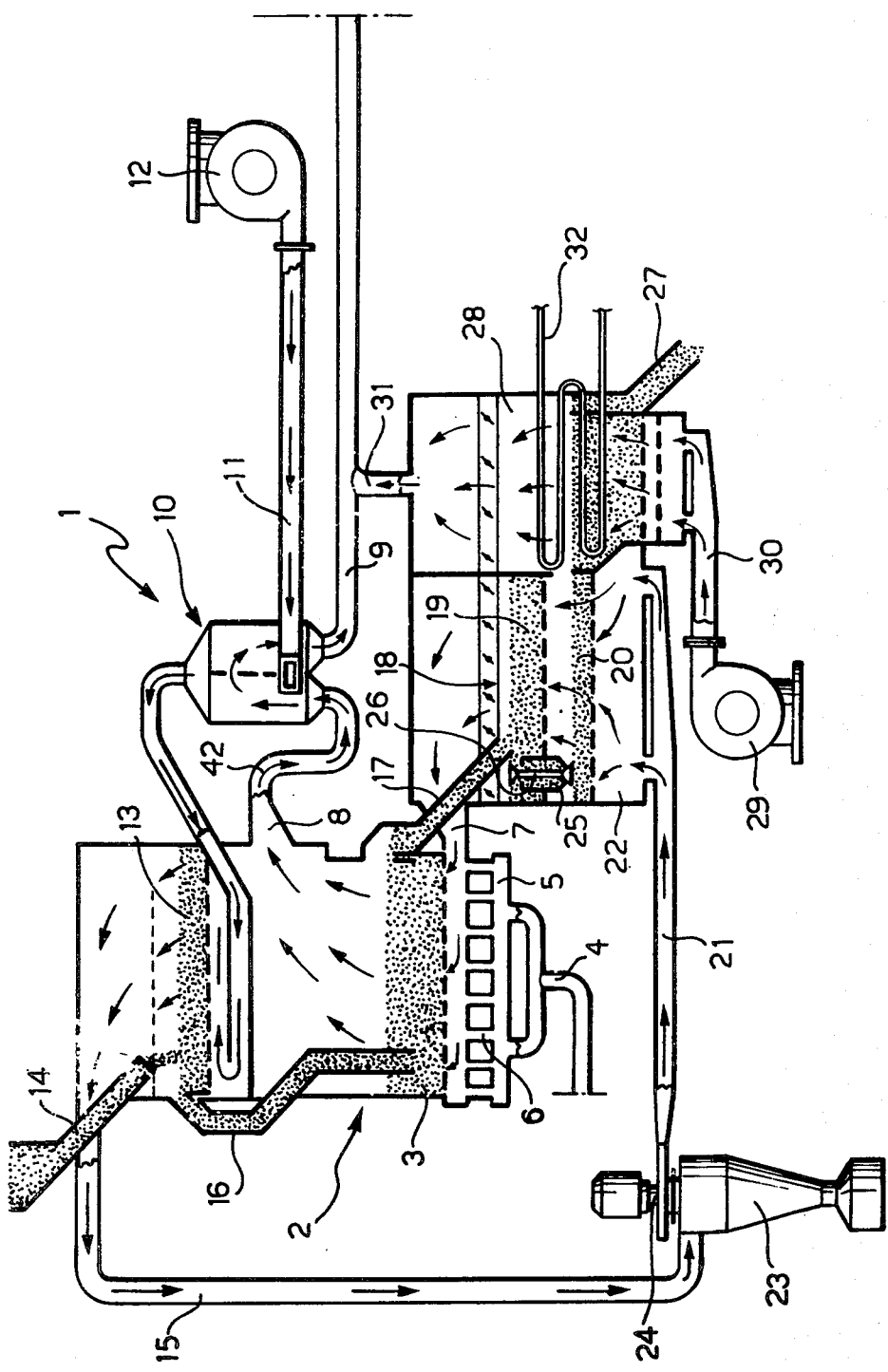

PLANT AND METHOD FOR REGENERATING SAND FROM FOUNDRY CORES AND MOULDS BY CALCINATION IN A FLUIDIZED-BED FURNACE

The present invention relates to plant for regenerating sand from foundry cores and moulds, of the type using a fluidized-bed calcining furnace and means for feeding a gaseous fuel and air into the bed so as to enable the gaseous fuel to burn within the bed and fluidize the bed.

It has already been proposed to use the fumes leaving the calcining furnace in order to heat the sand to be treated at its inlet to the furnace in order to reduce the consumption of the gaseous fuel which must be fed into the calcining bed. This solution has, however, the disadvantage of resulting in the enrichment of the fumes with polluting compounds, such as free phenol, formaldehyde, furfuryl alcohol and hydrogen cyanide, which are contained in the resins associated with the sand entering the furnace.

The object of the present invention is to provide a plant for regenerating foundry sand which enables the consumption of gaseous fuel supplied to the calcining furnace to be reduced considerably.

In order to achieve this object the invention provides a plant of the type specified above, the main characteristic of which lies in the fact that it further includes:

first heat-exchange means for heating a current of air by means of the fumes leaving the calcining furnace, second heat-exchange means for preheating the sand to be treated at its introduction to the calcining furnace by means of the current of air leaving the first heat-exchange means, and third heat-exchange means for heating the air leaving the second heat-exchange means by means of the purified sand leaving the calcining furnace, the heated air leaving the third heat-exchange means being used as the combustion air in the calcining furnace so as to eliminate any noxious substances with which this air may have been enriched in passing through the second heat-exchange means.

By virtue of this characteristic the plant according to the invention allows the fumes leaving the calcining furnace to be used to heat the sand to be treated entering the furnace itself without causing pollution of the fumes. Indeed, any noxious substances which vaporise in the sand-preheating stage are destroyed by combustion in the calcining furnace itself. At the same time, the heat from the purified sand leaving the calcining furnace is used to preheat the combustion air fed to the calcining furnace.

According to a further aspect, the present invention provides a method of regenerating sand from foundry cores and moulds by calcination in a fluidized-bed furnace, characterised in that the fumes leaving the calcining furnace are used to heat a current of air which is then used, in its turn, to heat the sand to be treated as it enters the calcining furnace, and in that the current of air cooled by the sand to be treated is then heated by the purified sand leaving the calcining furnace, then to be used as the combustion air in the calcining furnace.

Further characteristics and advantages of the present invention will emerge from the description which follows with reference to the appended drawings provided purely by way of non-limiting example, in which:

The FIGURE illustrates schematically a plant according to the present invention.

In the FIGURE reference numeral 1 generally indicates a plant for regenerating sand from foundry cores and moulds, comprising a fluidized-bed calcining furnace 2.

The lower part of the furnace 2 is occupied by a bed 3 constituted by the sand to be treated which is fluidized by means of air and a gaseous fuel (for example methane) which is fed into the bed by means of a system of ducts 4, 5, 6. Reference numeral 7 indicates the inlet duct for the combustion air which enables the gaseous fuel to burn within the bed and to fluidize the bed.

The furnace 2 has an outlet 8 through which the fumes produced by the combustion of the agglomerated resins in the material to be treated pass into a duct 9 which leads to a dust-removing device (not illustrated). In the duct 9 is connected a heat-exchanger 10 in which the heat from the fumes is used to heat a current of air fed into it through a duct 11 by means of a fan 12. The heated air flow leaving the heat-exchanger 10 flows into a duct 42 terminating in an upper portion of the calcining furnace. A further fluid bed 13 is located in this portion and is supplied with the sand to be treated which enters the furnace through an inlet duct 14. The heated air which flows through the duct 42 is fed into the bed 13 so as to fluidize it and is then discharged from the calcining furnace through a duct 15. Reference numeral 16 indicates a duct through which the sand heated in the bed 13 is conveyed from this bed onto the bed 3 of the calcining furnace.

The furnace 2 has an outlet 17 for the purified sand through which the sand is supplied to a bed 18 comprising two superimposed stages 19, 20 which are fluidized by means of the air coming from the duct 15. This duct 15 is connected to a duct 21 communicating with the chamber 22 within which is located the bed 18 through a dust-removing cyclone device 23 and an electric fan 24 for driving the air circulation. The chamber 22 also communicates with the duct 7 for feeding the combustion air to the furnace 2.

In the partition separating the upper stage 19 of the bed 18 from the lower stage 20 there is a passage 25 through which the purified sand passes from the upper stage 19 to the lower stage 20 of the bed 18. The passage 25 is controlled by a double-acting shutter 26 having two working positions (one of which is illustrated in the drawing) in which it obstructs the lower end and leaves the upper end of the passage 25 open or vice versa.

The chamber 22 communicates with a discharge duct 27 for the purified sand through a chamber 28 into which air is fed by a fan 29 through a duct 30. The chamber 28 has an outlet duct 31 communicating with the duct 9 and is further traversed by a coiled tube 32 carrying cooling water.

The plant described above operates as follows:

The sand to be treated is fed through the duct 14 on to the bed 13 located in the upper part of the calcining furnace 2. This bed is fluidized by means of the air supplied by the fan 12 through the duct 11, heated in the heat-exchanger 10 with the exhaust fumes from the calcining furnace, and passing through the duct 42. The sand thus heated passes from the bed 13 through the duct 16 onto the calcining bed 3 where the agglomerated resins in the sand are burnt. The fumes produced by this combustion leave through the outlet 8 and are directed to the dust-removing device after having yielded up the greater part of their heat to the air which traverses the heat exchanger 10.

By virtue of the arrangement described above, the sand to be treated is preheated by means of the latent heat of the fumes discharged form the calcining furnace without these fumes being enriched with polluting substances from the agglomerated resins, as occurs when the sand is preheated directly by the fumes.

The purified sand leaves the calcining furnace through the outlet duct 17, passes onto the upper stage 19 of the fluid bed 18 and thence passes through the passage 25 controlled by the shutter 26 onto the lower stage 20 and thence into the discharge duct 27 through the chamber 28.

As the same time, the air used for preheating the sand discharged onto the bed 13 disposed in the upper portion of the calcining furnace is conveyed through the duct 15 into the dust-removing device 23 and thence by means of the fan 24 into the chamber 22 so as to fluidize the bed 18. The air coming from the duct 21 is thus heated by means of the purified sand leaving the calcining furnace and is then used as the combustion air in the calcining furnace, being made to pass through the inlet duct 7 which communicates with the chamber 22.

The preheating of the sand to be treated, which is effected in the bed 13, and the preheating of the combustion air, effected in the bed 18, enable the consumption of gaseous fuel supplied to the calcining furnace to be reduced considerably.

The shutter 26 arranged in the passage 25 prevents the greater part of the air fed through the duct 21 into the chamber 22 and traversing the partition to the upper stage of the bed 18 from passing through the passage 25.

The shutter 26 is moved at predetermined time intervals by means of an actuator (not illustrated).

The purified sand cooled by the air which is to be used for combustion in the calcining furnace is further cooled by means of water flowing through the coil 32 and by means of the current of cold air supplied by the fan 29.

Naturally, the principle of the invention remaining the same, the details of construction and the embodiments may be varied widely with respect to that described and illustrated, purely by way of example, without thereby departing from the scope of the present invention.

For example, the bed 13 may, to advantage, have several superimposed stages so as to achieve more efficient heat exchange.

What is claimed is:

1. Plant for regenerating sand from foundry cores and moulds, including a fluidized bed calcining furnace having means for feeding a gaseous fuel and means for feeding air into a calcination bed formed by said sand so as to burn said fuel within, fluidize and calcine said sand bed to regenerate said sand, and respective means for withdrawing regenerated sand and combustion fumes from said calcining furnace; and wherein said plant further includes:

air delivery means;

first heat exchange means connected to said air delivery means and said means for withdrawing fumes from said furnace for heating air delivered by said air delivery means by means of said fumes withdrawn from said calcining furnace;

second heat-exchange means connected to said first heat exchange means for preheating the sand to be regenerated by means of the heated air leaving the first heat exchange means;

air circulating means connected to said second heat exchange means for circulating air leaving said second heat-exchange means;

third heat-exchange means connected to said air circulating means and said means for withdrawing regenerated sand from said furnace for heating air circulated thereto by said circulating means by means of the regenerated sand delivered from said calcining furnace by the respective said withdrawing means; and said means for feeding air to said calcination bed being supplied with air heated in said third heat-exchange means whereby any noxious substances with which this air may have been enriched in passing through said second heat-exchange means are substantially eliminated.

2. Plant as claimed in claim 1, wherein:

said second heat-exchange means are constituted by a bed with at least one stage located in an upper part of said calcining furnace and formed by said sand to be treated;

means are provided for feeding said heated air leaving said first heat-exchange means into said bed of sand to be treated so as to fluidize and heat this bed; and means are provided for conveying the sand to be treated from said second heat-exchange means onto said calcination bed.

3. Plant as claimed in claim 1, wherein said third heat-exchange means comprise a bed with at least one stage constituted by said regenerated sand deliverd from said calcining furnace and wherein said circulating means are arranged to feed said air leaving said second heat-exchange means into said bed of regenerated sand so as to fluidize said bed.

4. Plans as claimed in claim 3, wherein said bed constituted by regenerated sand has at least two stages in cascade; means define a respective passage between each adjacent pair of said stages for ducting sand from the upper stage to the lower stage of the respective said adjacent pair; and a double acting shutter is provided in each said passage and is movable between a first working position, in which it closes the upper end and leaves open the lower end of the passage, and a second working position in which it leaves open the upper end and closed the lower end of the passage.

5. A method for regenerating sand from foundry cores and moulds in a fluidized bed calcining furnace having means for feeding a gaseous fuel and means for feeding air into a calcination bed formed by said sand so as to burn said fuel within, fluidize and calcine said sand bed to regenerate said sand and respective means for withdrawing regenerated sand and combustion fumes from said calcining furnace comprising:

heating a current of air in a first heat exchanger by means of fumes leaving said furnace;

preheating the sand to be regenerated in a second heat exchanger by means of the heated current of air;

circulating the current of air leaving said second heat exchanger to a third heat exchanger to reheat said current of air by means of regenerated sand delivered from said currents to said third heat exchanger and feeding said reheated current of air to said calcination bed.

* * * * *